United States Patent [19]

Wilson

[11] Patent Number: 5,782,601
[45] Date of Patent: Jul. 21, 1998

[54] VEHICLE TOWING APPARATUS

[76] Inventor: Paul M. Wilson, c/o Fred Greco 1300 Old Chain Bridge Rd., McLean, Va. 22101

[21] Appl. No.: 594,654

[22] Filed: Feb. 2, 1996

[51] Int. Cl.$^6$ .................................................. B60P 3/12
[52] U.S. Cl. ................................. 414/563; 280/402
[58] Field of Search .......................... 414/563, 426, 414/429; 280/402

[56] References Cited

U.S. PATENT DOCUMENTS

| | | | |
|---|---|---|---|
| 4,194,755 | 3/1980 | Youngblood | 280/402 |
| 4,384,817 | 5/1983 | Peterson | 414/563 |
| 4,564,207 | 1/1986 | Russ et al. | 414/563 X |
| 4,632,629 | 12/1986 | Kooima | 414/563 |
| 4,674,943 | 6/1987 | Nespor | 414/563 |
| 4,678,392 | 7/1987 | Capers et al. | 414/563 |
| 4,741,661 | 5/1988 | Carey | 414/563 |
| 4,761,111 | 8/1988 | Brown | 414/563 |
| 4,861,221 | 8/1989 | Krisa | 414/563 |
| 5,354,167 | 10/1994 | Cullum et al. | 414/563 |
| 5,518,260 | 5/1996 | Grignon | 414/563 X |

FOREIGN PATENT DOCUMENTS

| | | | |
|---|---|---|---|
| 2069809 | 12/1992 | Canada | 280/402 |
| 874391 | 10/1981 | U.S.S.R. | 280/402 |

*Primary Examiner*—David A. Bucci

[57] ABSTRACT

Apparatus for lifting and towing vehicles includes a boom assembly which can be folded and unfolded by use of hydraulics. Drumstick shaped members are connected at the end of the boom assembly and can be moved to engage and hold tires or wheels of towed vehicles in cooperation with a bar member also attached at the end of the boom assembly.

1 Claim, 7 Drawing Sheets

1
VEHICLE TOWING APPARATUS

BACKGROUND OF THE INVENTION

This invention relates to apparatus for towing vehicles and more particularly to a device which can be used by tow trucks to make connection with a vehicle to be towed by two arms which attach to either the front or rear tires of the motor vehicle to be towed.

Many different types of towing devices for towing vehicles are known, but these systems require numerous hydraulic cylinders and lines.

It is, therefore, an object of the present invention to provide apparatus for towing vehicles.

Another object is to provide such apparatus which uses an electrical motor with chain link drive mechanisms to position arms underneath tires of the vehicle to be towed.

A further object of the invention is the provision of such a vehicle towing apparatus which requires use of only two hydraulic cylinders and two hydraulic lines.

Another object is to provide such apparatus which has a main boom that is operated by hydraulics already available on existing systems, and is operated by leverage by use of an arm connected to the boom.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides an automotive vehicle lifting and towing truck comprising: a first hydraulic cylinder connected at a first end to a bed of the truck and at a second end to a first boom member; the first boom member pivoted to the bed of the truck at one end and extending over the bed to a second boom member pivoted to the first boom member at another end of the first boom member, the second boom member extending vertically below the first boom member; a third boom member pivoted to a lower end of the second boom member, the third boom member having a portion extending forwardly of the second boom member and a portion extending rearwardly of the second boom member, the forwardly extending portion including a wedge roller bearing and the rearwardly extending portion including a vehicle wheel lift; a spring member extending between an upper portion of the second boom member and the third boom member; and a lower boom folding wedge located below the first boom member, the lower boom folding wedge including a lift portion which engages the wedge roller upon lifting of the third boom by the first hydraulic cylinder thereby pivoting the third boom member about the pivot to the second boom member whereby the spring member is tensioned and the third boom member is pivoted to a folding position.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

DESCRIPTION OF THE PREFERRED EMBODIMENT

Figure 1:
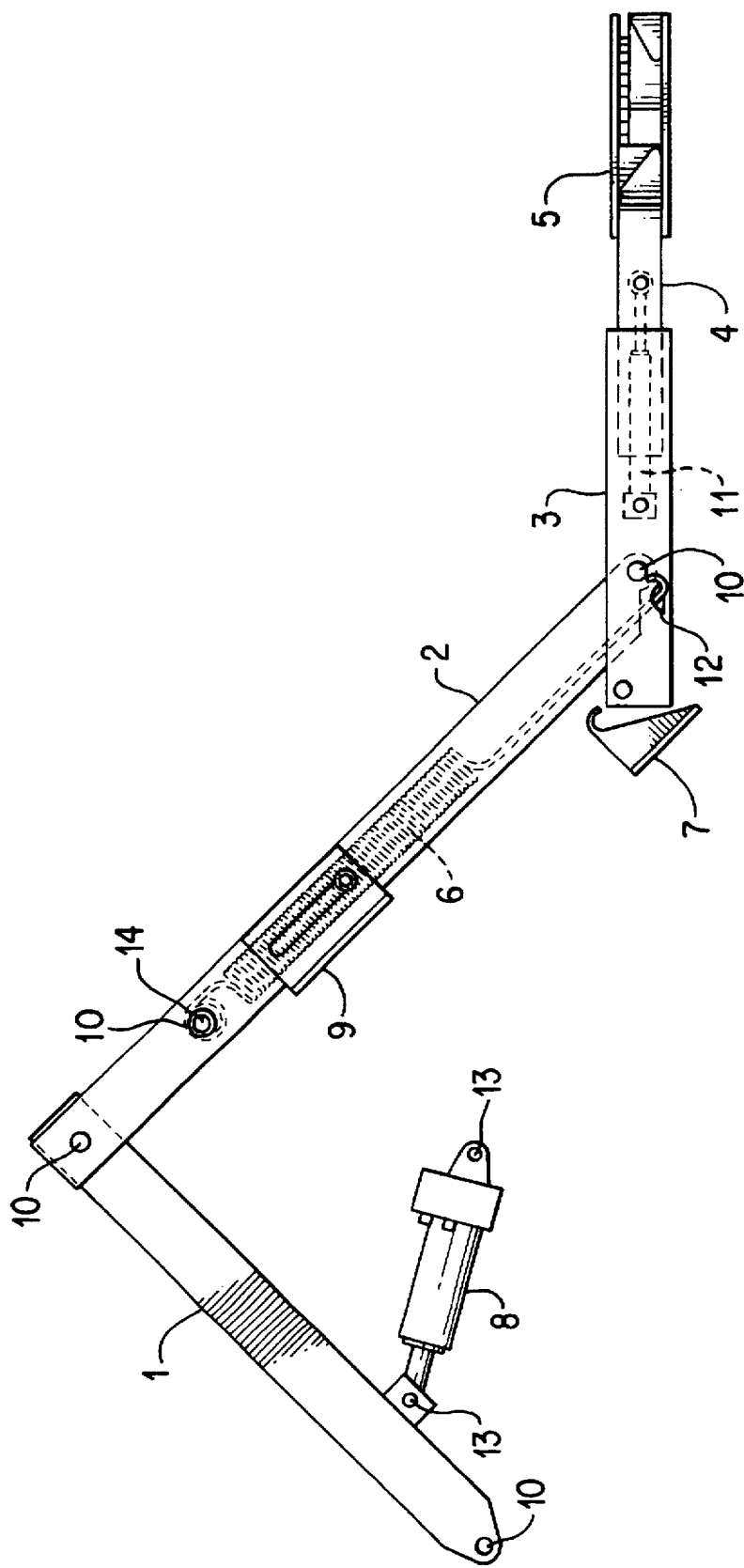
FIG. 1 is a diagrammatic side view of the apparatus in the unfolded position for towing a vehicle.

With reference now to the drawings, wherein like reference characters designate like or corresponding parts throughout the several views, there is shown the apparatus of this invention which is run by hydraulics on existing systems. The apparatus of this invention can be used by tow trucks to make connection with the vehicle to be towed by two arms which attach to either the front or rear tires of the motor vehicle to be towed. The apparatus is unique and different from any other product because it uses an electrical motor with chain link drive mechanisms to position the arms which attach to the tires of the vehicle to be towed. This allows the system to operate with only two hydraulic cylinders as opposed to the seven or more cylinders used on all other systems. The apparatus of this invention, because it has only two hydraulic cylinders, only has two hydraulic lines as opposed to the large number of hydraulic lines on other systems. In addition, the main booms operation, which is run by hydraulics on existing systems, is operated by leverage by use of an arm connected to the boom.

1 is the main up and down lift boom for the apparatus which lifts and lowers for towing.

2 is a boom connected to boom 1 to hang down at an approximately forty-five degree angle to house inside the unfolded spring 6.

3 is a boom connected to boom 2 to form the assembly shown in FIG. 1, which illustrates the apparatus in an unfolded position.

4 is a stinger extension that is moved in and out by element 12 which is part of a hydraulic cylinder.

5 is an element mounted to extension 4 by pin 24, and element 5 holds the electrical chain driven drumsticks claws unit for carrying the towed vehicle by its two wheels.

6 is the unfold spring for the apparatus, when the apparatus is lowered spring 6 unfolds boom 3 to a horizontal position.

7 is a pie slice shaped wedge with a curve. When boom 1 is lifted by hydraulic motor 8, lower boom 3 is extended to element 7 as shown in FIG. 1. Wedge 7 will hold an end of boom 3 at a stop position so boom 3 will fold as shown in FIG. 2.

Figure 2:
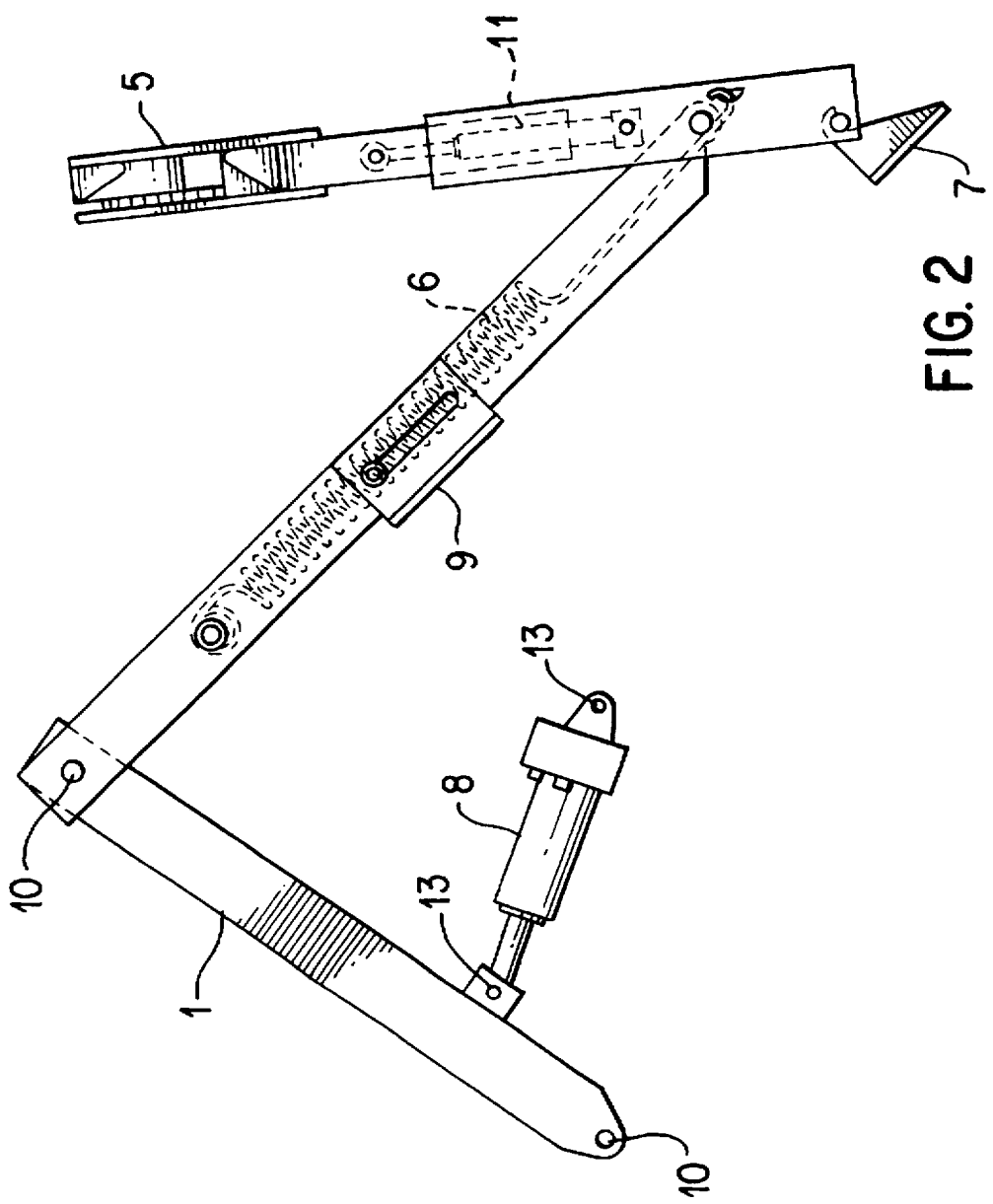
FIG. 2 is a diagrammatic side view of the apparatus in a folded position.

8 is a hydraulic motor which raises and lowers boom 1 which lowers and raises and folds the apparatus to its position shown in FIG. 2.

Figure 3:
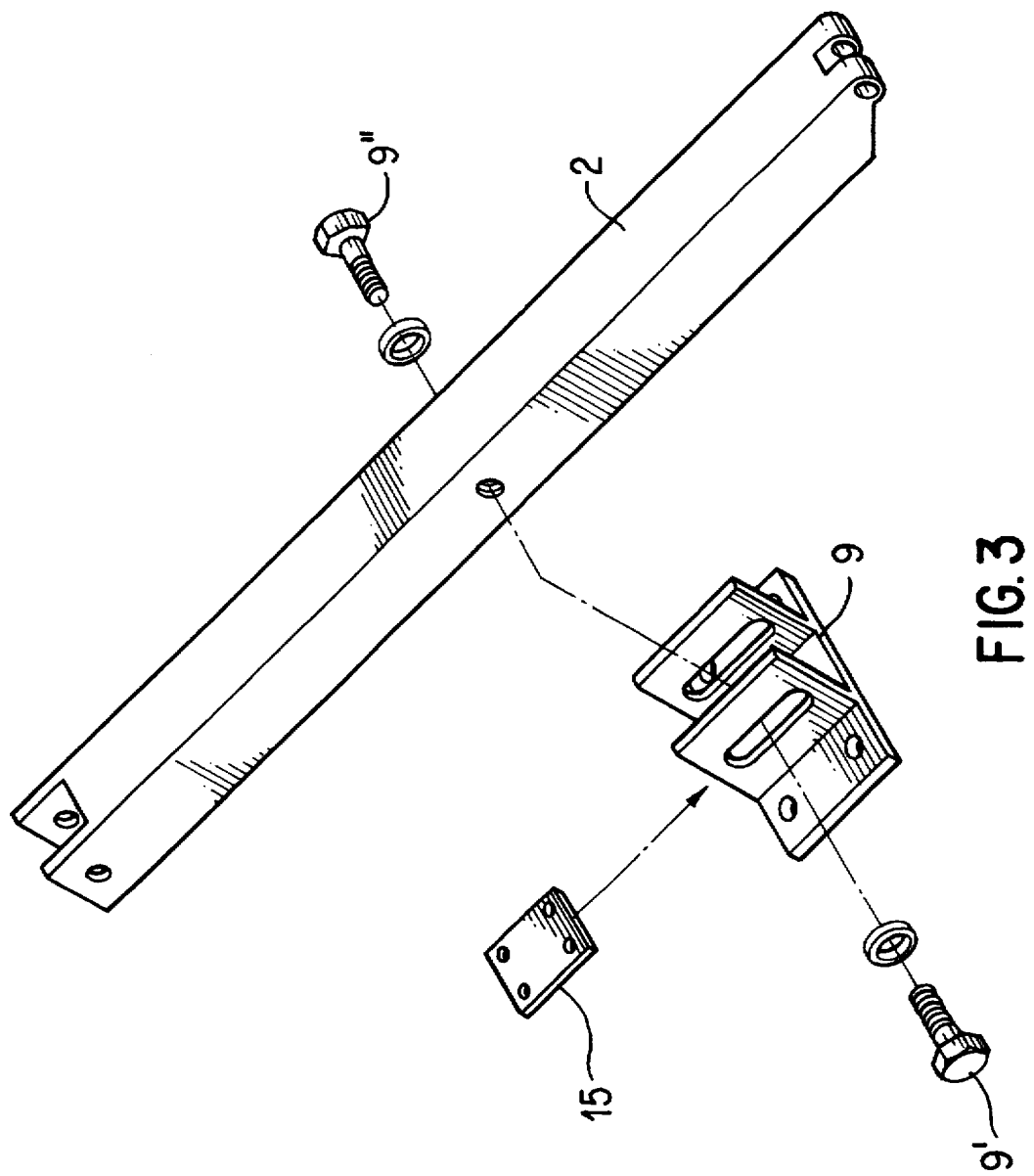
FIG. 3 is an exploded perspective view showing the boom, slip plate, bracket boom stabilizer and up and down slideplate.

9 is a guide plate for boom 2 when the apparatus is assembled. Boom 2 is held in place with two bolts 9', 9" shown in FIG. 3 to stabilize boom 2 from swinging out and in or from side to side.

10 is several pin holes which hold boom 1 to its mounting place and join the apparatus together. Pins are used to join the apparatus together by positioning the pins through pin holes 10.

11 is a hydraulic cylinder to extend the length of boom 3 and stinger extension 4 to their minimum or maximum positions.

12 is a loop welded to boom 3 to hook spring 6 into the loop.

13 are two pins used to mount hydraulic motor 8 to the lower lift fold boom cylinder and a vehicle bed.

Figure 4:
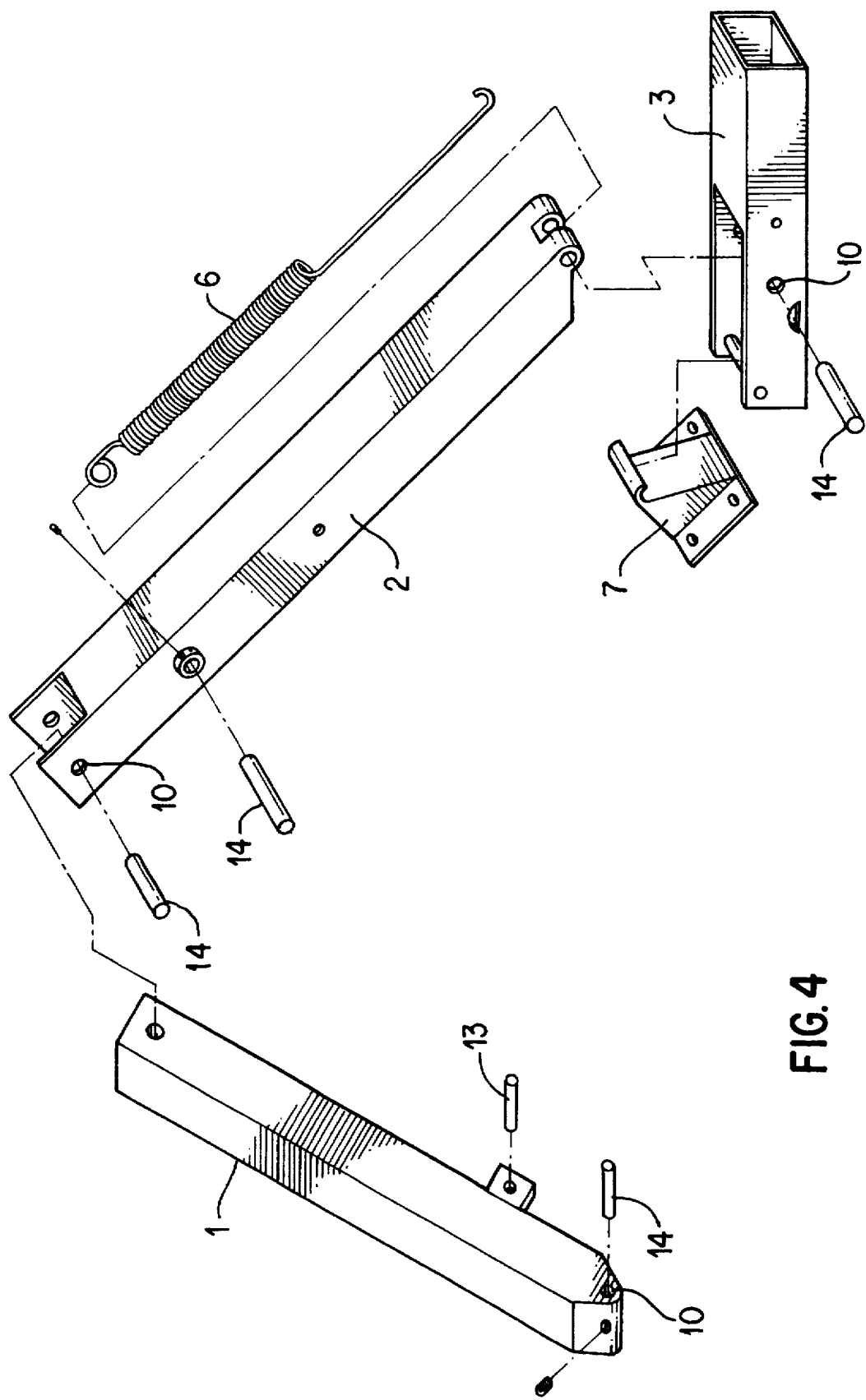
FIG. 4 is an exploded perspective view showing three booms of the apparatus with the unfolded spring and folding wedge plate of the apparatus.

14 shown in FIG. 4 are pins that are used for connecting together various elements of the apparatus shown in FIG. 4.

15 is a plastic slip plate that fits between opposed walls of guide plate 9 and boom 2 to reduce friction.

Figure 5:
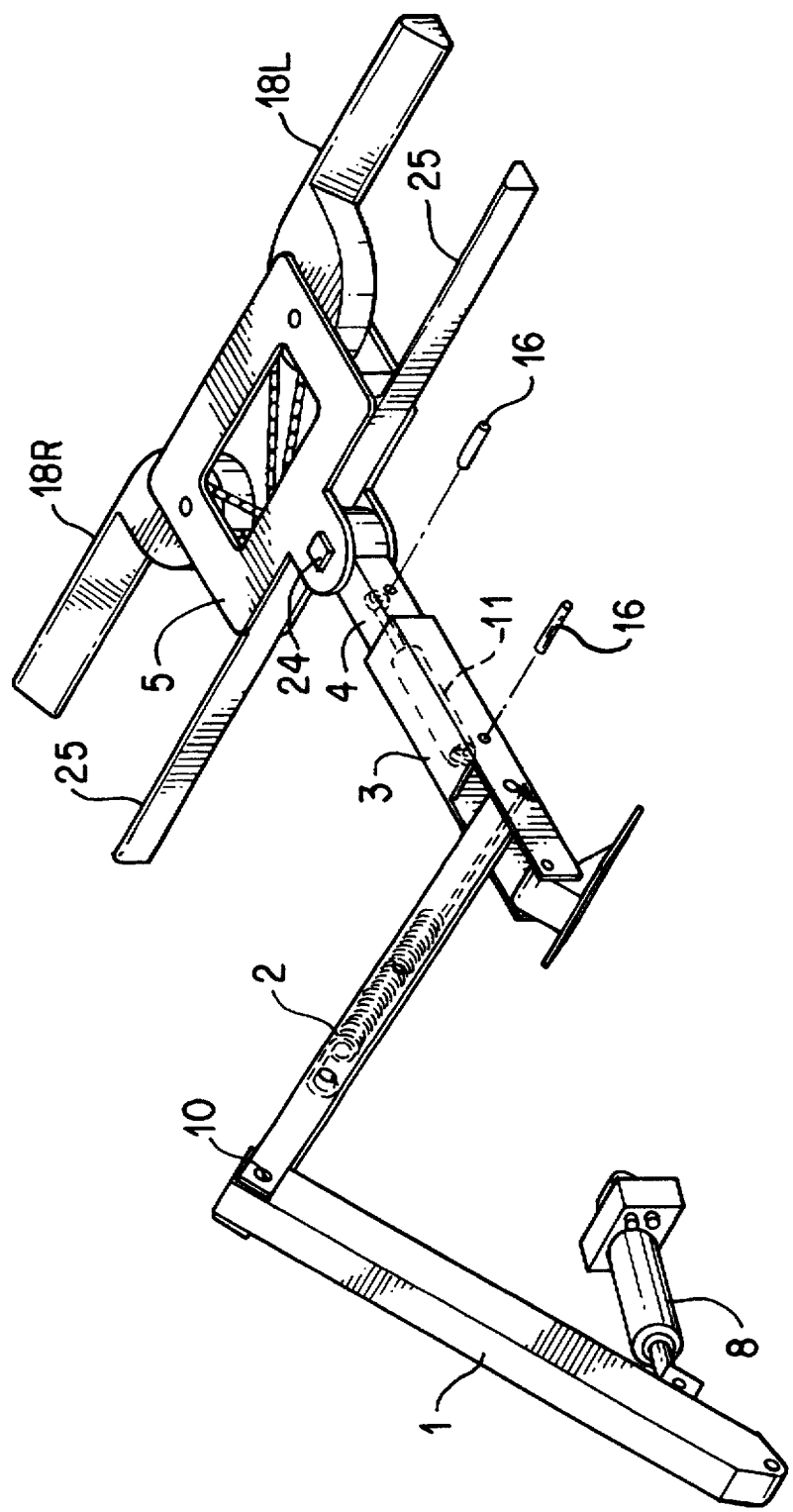
FIG. 5 is a diagrammatic view showing the apparatus with unfolded spring and with extension cylinder and with the main boom cylinder.

16 is a pin holding hydraulic cylinder 11 in place inside boom 3. See FIG. 5.

18L and 18R are the left and right drumstick claws of the apparatus which are rotated with respect to each other and with respect to bar 25 for holding the wheels or tires of the towed vehicle between drumstick claws 18L, 18R and bar 25.

20 are two pins used to hold drumstick claws 18L and 18R in element 5.

21 are two ring gears meshed to a worm gear side by side which turns the chain sprocket 19 in the same direction by operation of an electrical motor. The motor can operate in forward and reverse directions which moves chains R22, L22 to open and close drumstick claws 18R, 18L.

Figure 6:
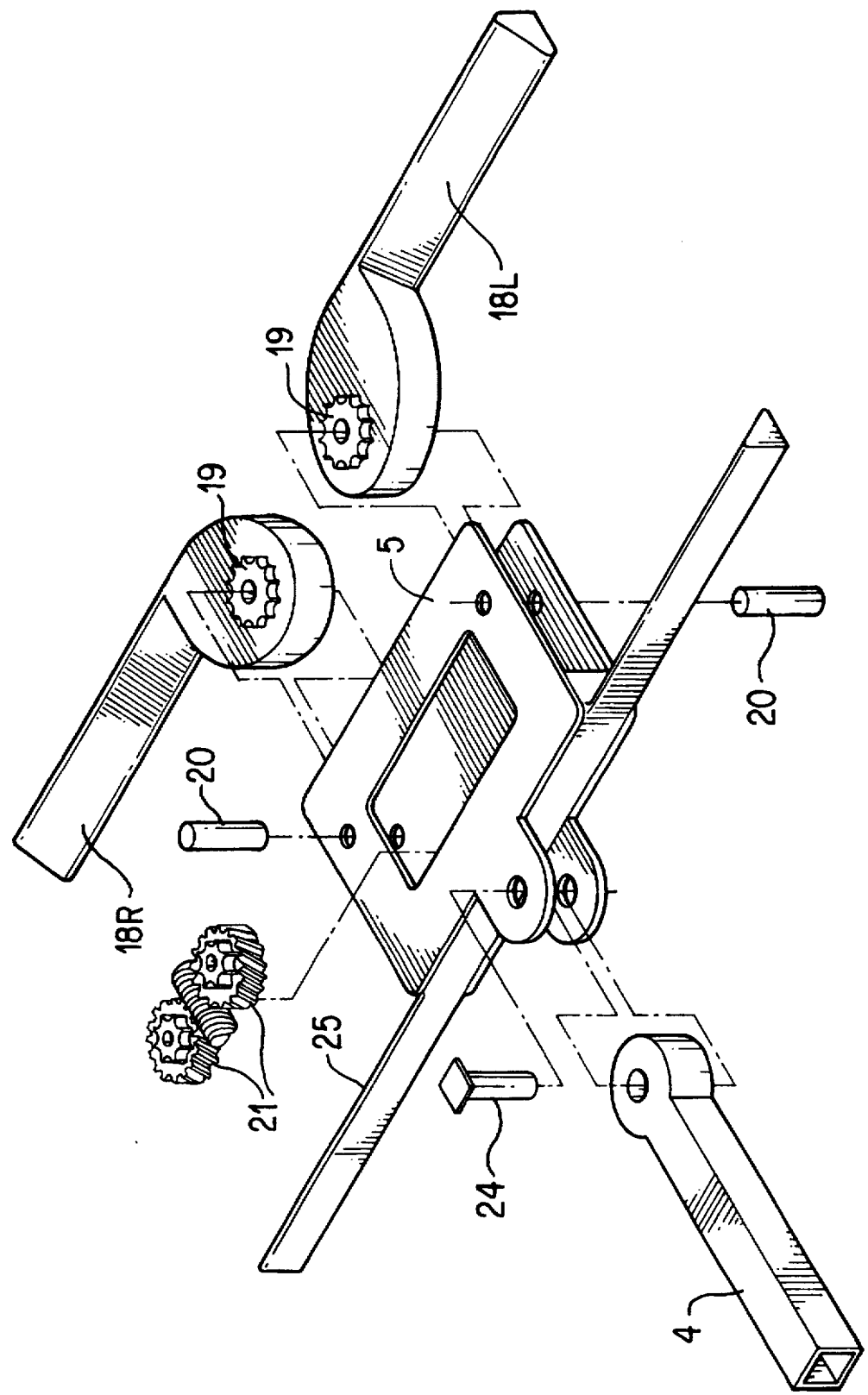
FIG. 6 is an exploded perspective view showing claws which hold wheels or tires of the towed vehicle and showing the gear hookup configuration.
Figure 7:
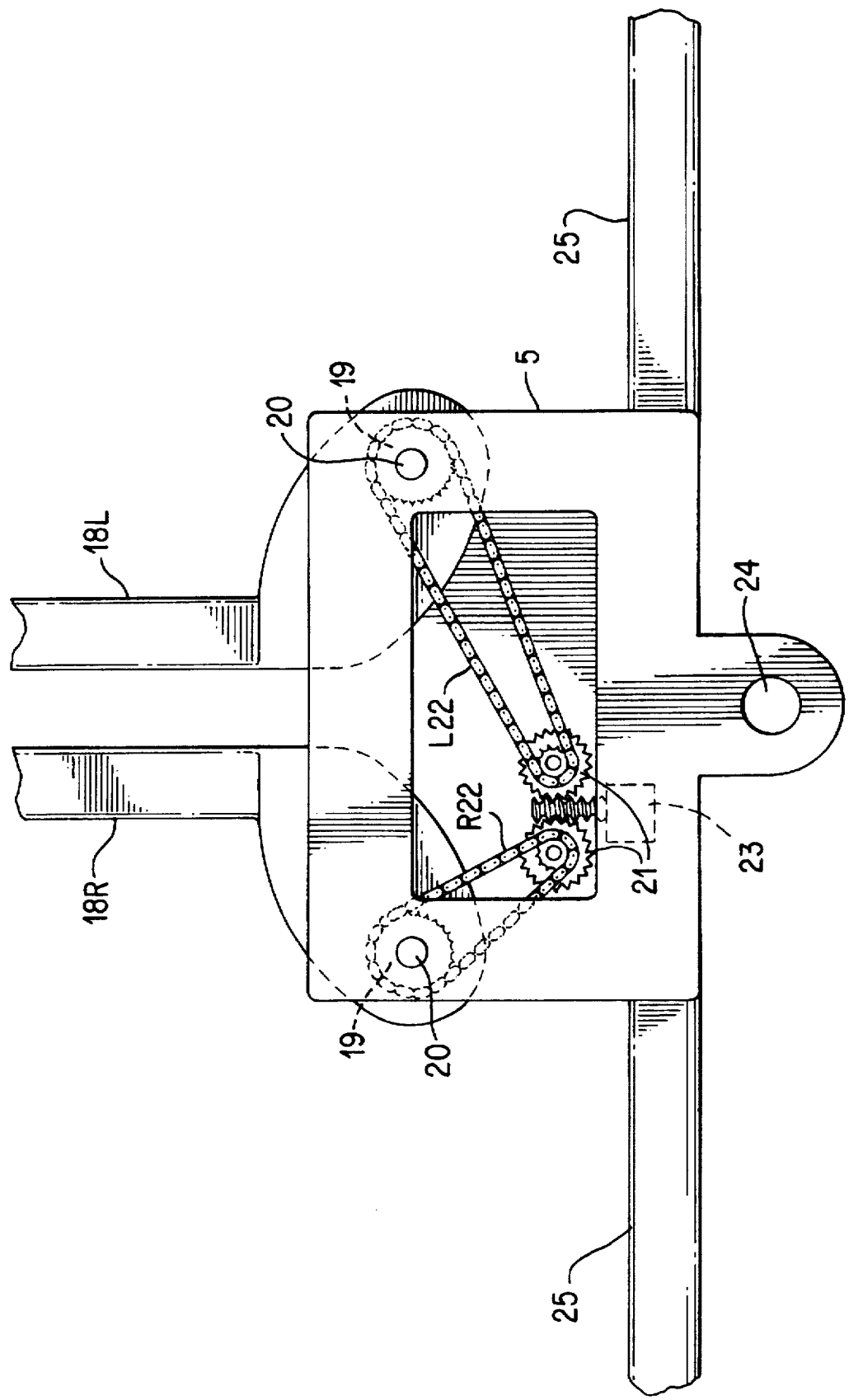
FIG. 7 is a detailed diagrammatic view showing the chains and sprockets of the apparatus.

24 is a pin used to connect element 5 to stinger extension 4. See FIG. 6.

25 is a support bar holding the tires or wheels of the towed vehicle in cooperation with drumstick claws 18L, 18R as previously described. Bar 25 is attached to element 5. Bar 25 is rotatably connected to the end of extension 4 by pin 24.

This invention is an apparatus for towing vehicles which when mounted, bolted or welded, on any truck, allows the truck to become a wrecker truck. The apparatus of this invention can be folded into a compact storage position, and the wrecker truck with this apparatus can be used for pulling, lifting and towing vehicles.

Most every other towing or wheel suspension system requires a large number of hydraulic cylinders to operate the system. Every hydraulic cylinder needed by a system requires two fluid lines to each cylinder for operating the cylinder. Because of the unique folding/unfolding system of this invention, and because of the electric powered system of chains and sprockets geared to each other, the need for any more than two hydraulic cylinders is eliminated. This, in turn, eliminates the need for two fluid lines for each hydraulic cylinder eliminated.

The apparatus of this invention is a compact unit which has a minimum of moving parts and will tow vehicles without damaging the body, the tires or the wheels of the towed vehicle.

The number 1 boom is attached to the truck bed and a hydraulic cylinder is attached to the number 1 boom on one end and to the bottom of the truck on the other end. When this hydraulic cylinder is extended, it lifts the number 1, 2 and 3 booms. As the booms lift, the lower boom fold wedge plate stabilizes by hooking onto the wedge pin/stop. After this engagement, the number 3 boom is folded up toward a position immediately adjacent to number 2 boom (see FIGS. 1 and 2).

When the apparatus is in position for towing with stinger 4 extended and ready for use (FIG. 1), drumstick claws 18L, 18R are then operated by remote control of the electric motor. Drumstick claws 18L, 18R (otherwise known as wheel lifts, wheel forks or jaws) simultaneously open and close by being connected to each other by chains and sprockets geared to each other and powered by an electric motor.

The apparatus of this invention provides for a folding and unfolding configuration and an electrical motor which can be controlled so that no damage to the wheels, tires and/or body of the vehicle being towed occurs.

The invention in its broader aspects is not limited to the specific details shown and described, and departures may be made from such details without departing from the principles of the invention and without sacrificing its chief advantages.

I claim:

1. An automotive vehicle lifting and towing truck comprising:

a first boom member and a second boom member;

a first hydraulic cylinder connected at a first end to a bed of the truck and at a second end to said first boom member;

said first boom member pivoted to said bed of the truck at one end and extending over said bed to said second boom member pivoted to said first boom member at another end of said first boom member, said second boom member extending vertically below said first boom member;

a third boom member pivoted to a lower end of said second boom member, said third boom member having a portion extending forwardly of said second boom member and a portion extending rearwardly of said second boom member, said forwardly extending portion including a wedge roller bearing and said rearwardly extending portion including a vehicle wheel lift;

a spring member extending between an upper portion of said second boom member and said third boom member;

and a lower boom folding wedge located below said first boom member, said lower boom folding wedge including a lip portion which engages said wedge roller bearing upon lifting of said third boom by said first hydraulic cylinder thereby pivoting said third boom member about said pivot to said second boom member whereby said spring member is tensioned and said third boom member is pivoted to a folding position.

* * * * *